Patented June 5, 1945

2,377,552

UNITED STATES PATENT OFFICE 2,377,552

COMPOSITIONS OF MATTER AND METHODS AND STEPS OF MAKING AND USING THE SAME

Mortimer T. Harvey, South Orange, N. J., assignor to The Harvel Corporation, a corporation of New Jersey No Drawing. Original application September 1, 1939, Serial No. 293,057. Divided and this application June 5, 1943, Serial No. 489,815

3 Claims. (Cl. 260—512)

The present invention relates to new aryl-alkyl sulphonic acids and to methods of making the same, and the present invention relates more particularly to sulphonic acids derived from phenols having unsaturated hydrocarbon substituents on the nucleus thereof and to methods for preparing them.

The present application is a division of my copending application Serial Number 293,057, filed September 1, 1939, which matured into Patent No. 2,324,300, July 13, 1943, which is a continuation in part of my copending application Ser. No. 174,662 filed November 15, 1937, which matured into Patent No. 2,317,607 April 27, 1943.

The sulphonic acids of the present invention are suitable for general use where such compounds are used and are particularly suited as detergents and wetting agents and for allied purposes.

Examples of ethers suitable for use in the practice of the present invention are the alkyl ethers of cashew nut shell liquid and cardanol and preferably those ethers in which the alkyl radicals in ether relation have from one to five carbons and which preferred ethers include the primary, secondary and tertiary alkyl ethers of the above named phenols.

In the illustrative examples given herein the temperature of reaction given may be below that of the melting point of the pure phenolic ether used but it is a temperature at which the commercial grade of product will be in a liquid state.

Reference is hereby made to Harvey Patent Number 2,098,824, of November 9, 1937, for a disclosure of the composition of cashew nut shell liquid and its constituents and also of cardanol.

Following are illustrative examples of the methods and products of the present invention.

*Example 1.*—Substantially equal parts by weight of concentrated sulphuric acid and of the ethyl ether of cashew nut shell liquid are heated together at about 110° C. for about one hour after which the reaction mass is chilled and the sulphuric acid and water layer is separated from the reaction product layer which latter is neutralized to the point of being slightly acid and then filtered. The filtrate is evaporated to dryness to obtain the solid product.

*Example 2.*—Substantially equal parts by weight of the propyl ether of cardanol and of sulphuric acid, concentrated, are handled in the same manner as in Example 1 to obtain the sulphonic acid of propyl ether of cardanol.

*Example 3.*—About one hundred parts by weight each of the ethyl ether of cardanol and of concentrated sulphuric acid were heated together at about 110° C. for about forty minutes (twenty to sixty minutes) after which the mass was cooled, the unreacted sulphuric acid and water poured off. The sulphonic acid was then dissolved in water, being completely soluble, and neutralized with sodium hydroxide. The precipitated sodium sulphate was filtered, the sodium salt of the sulphonic acid of the ethyl ether of cardanol being completely soluble in the water and going with the filtrate.

*General example.*—Marking nut shell liquid and urushiol and ethers thereof can be used in the methods of Examples 1 to 3, inclusive, to obtain similar sulphonic acids.

As is common to sulphonic acids the exact constitution of the final product is unknown and the amount or degree of sulphonation can be controlled by varying the amount of sulphuric acid used in the sulphonation process and this can be from about one molecular equivalent to about five molecular equivalents of sulphuric acid to each mole of aryl compound used, for example, but these proportions are not considered limiting, except in a practical way to obtain desirable yield of a desired product.

The new compounds of the present invention including the sulphonic acids described and illustrated by examples are useful generally where sulphonic acids are used and are particularly suitable in the wetting and detergency of textiles.

Although different methods of handling the reagent materials in bringing them together and in handling the reaction products to remove from the reaction mass are described in the above examples this is to be considered as illustrating rather than limiting.

Having thus described my invention, what I claim and desire to protect by Letters Patent is:

1. A sulphonic acid of an alkyl ether of a material selected from the group consisting of cardanol and cashew nut shell liquid.

2. A sulphonic acid of an alkyl ether of cardanol.

3. A sulphonic acid of an alkyl ether of cashew nut shell liquid.

MORTIMER T. HARVEY.